(12) United States Patent
Gordon

(10) Patent No.: US 11,878,570 B2
(45) Date of Patent: Jan. 23, 2024

(54) VENTED ROOF PANEL

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 0 days.

(21) Appl. No.: 17/990,304

(22) Filed: Nov. 18, 2022

(65) Prior Publication Data
US 2023/0085077 A1 Mar. 16, 2023

Related U.S. Application Data

(63) Continuation of application No. 16/287,934, filed on Feb. 27, 2019, now Pat. No. 11,524,554.

(60) Provisional application No. 62/646,827, filed on Mar. 22, 2018.

(51) Int. Cl.
*B60H 1/30* (2006.01)
*B60H 1/26* (2006.01)

(52) U.S. Cl.
CPC .............. *B60H 1/30* (2013.01); *B60H 1/262* (2013.01)

(58) Field of Classification Search
CPC .......... B62D 25/06; B62D 25/10; B60H 1/30; B60H 1/262; B60H 1/00471
USPC ................... 454/146, 138, 137, 136; 296/102
See application file for complete search history.

(56) References Cited

U.S. PATENT DOCUMENTS

| | | | |
|---|---|---|---|
| 6,883,846 B2 * | 4/2005 | Cheek | B60J 7/08 296/213 |
| D640,595 S * | 6/2011 | Zhang | D12/16 |
| 11,524,554 B2 * | 12/2022 | Gordon | B60H 1/30 |

OTHER PUBLICATIONS https://www.etrailer.com/RV-Vents-and-Fans/Redline/9106.html. (Redline, attached).*

* cited by examiner

*Primary Examiner* — Vivek K Shirsat
(74) *Attorney, Agent, or Firm* — Barry Choobin; Patent 360

(57) ABSTRACT

A vented roof panel is provided for an overhead portion of a roll-over protection system of an off-road vehicle. The vented roof panel comprises a planar member that includes a shape and a curvature that match the overhead portion to enable closely attaching the vented roof panel to the roll-over protection system. The planar member is formed of any of various plastics, such as injection molded plastic, or other similar materials. An air scoop including an air inlet port is centrally disposed in the planar member. The air inlet port is disposed in a forward-facing portion of the air scoop and configured to direct an airstream from outside to underneath the vented roof panel. The vented roof panel may be attached to tubular frame members comprising the roll-over protection system by way of one or more suitable fasteners.

17 Claims, 4 Drawing Sheets

VENTED ROOF PANEL

PRIORITY

This application claims the benefit of and priority to U.S. patent application Ser. No. 16/287,934 filed Feb. 27, 2019 and U.S. Provisional Application, entitled "Vented Roof Panel," filed on Mar. 22, 2018 and having application Ser. No. 62/646,827.

FIELD

The field of the present disclosure generally relates to vehicle safety. More particularly, the field of the invention relates to an apparatus for a vented roof panel for coupling with a vehicle roll-cage to provide protection to occupants within the vehicle during travel over rough terrain or during a rolling over of the vehicle.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A frame comprised of multiple structural members with attached doors is configured to protect the occupants in the event of a rollover situation. Given that off-road vehicles routinely travel over very rough terrain, such as mountainous regions, and are prone to tipping over, there is a desire to improve the safety, convenience, and comfort of off-road vehicles, while at the same improving the performance of such vehicles.

SUMMARY

A vented roof panel is provided for an overhead portion of a roll-over protection system of an off-road vehicle. In an embodiment, the vented roof panel comprises a planar member including a shape and a curvature that match the overhead portion to facilitate closely attaching the vented roof panel to the roll-over protection system. The planar member may be formed of a rigid material, such as any of various plastics, preferably injection molded plastic, or other similar materials. An air scoop including an air inlet port is centrally disposed in the planar member. The air inlet port is disposed in a forward-facing portion of the air scoop and configured to direct an airstream from outside to inside the vehicle. The vented roof panel may be attached to tubular frame members comprising the roll-over protection system by way of one or more suitable fasteners. A front lip extends along the width of the vented roof panel from a driver side to a passenger side of the vehicle. The front lip is swept at a similar oblique angle as a windshield portion of the roll-over protection system and is configured to protect occupants from rocks and other debris. In some embodiments, rear and side lips are disposed along the edges of the vented roof panel and configured to direct water runoff away from a top portion of the vented roof panel.

In an exemplary embodiment, a vented roof panel for an overhead portion of a roll-over protection system of a vehicle comprises: a planar member including a shape and a curvature that match the overhead portion; an air scoop that is centrally disposed in the planar member; and an air inlet port disposed in a forward-facing portion of the air scoop.

In another exemplary embodiment, the planar member is formed of any of various plastics, such as injection molded plastic, or other similar material. In another exemplary embodiment, the shape and the curvature facilitate closely coupling the vented roof panel to the overhead portion of the roll-over protection system. In another exemplary embodiment, the planar member is configured to provide additional head protection to occupants of the vehicle.

In another exemplary embodiment, the air inlet port is configured to direct an airstream from outside to inside the vehicle. In another exemplary embodiment, the air inlet port is configured to reduce heated air being trapped above the heads of occupants of the vehicle. In another exemplary embodiment, the air inlet port is configured to allow heated air to escape through the air scoop, thereby maintaining a relatively cool environment within the vehicle. In another exemplary embodiment, the air scoop is implemented with a forward-facing panel, in lieu of the air inlet port. In another exemplary embodiment, the forward-facing panel is configured to give a practitioner a choice of creating a custom air inlet port or leaving the forward-facing panel intact.

In another exemplary embodiment, the vented roof panel further comprises a front lip that extends along the width of the vented roof panel. In another exemplary embodiment, the front lip is swept at a substantially similar oblique angle as a windshield portion of the roll-over protection system. In another exemplary embodiment, the front lip is configured to protect occupants in a cab enclosure of the vehicle from falling rocks and other debris. In another exemplary embodiment, the front lip is configured to operate similarly to a visor that blocks at least a portion of the sun's rays from hindering a driver's vision.

In another exemplary embodiment, fasteners are implemented to attach the vented roof panel to the overhead portion of the roll-over protection system, the fasteners being disposed near corner portions of the vented roof panel. In another exemplary embodiment, the fasteners include one or more of any of various hardware fasteners suitable for securely coupling the vented roof panel to tubular frame members comprising the overhead portion. In another exemplary embodiment, the fasteners comprise any of bolts, nuts, washers, rivets, screws, locking pins, clamps, clasps, clips, retaining rings, and the like.

In another exemplary embodiment, the vented roof panel further comprises a rear lip extending along the width of the vented roof panel. In another exemplary embodiment, the rear lip comprises a strip portion of the vented roof that is angled at or near a substantially 90-degree angle with respect to a top portion of the vented roof panel. In another exemplary embodiment, the rear lip overhangs one or more tubular frame members comprising a rear portion of the roll-over protection system. In another exemplary embodiment, the rear lip is configured to hide the one or more tubular frame members from direct view. In another exemplary embodiment, the rear lip is configured to provide a drip line for water runoff from the top portion of the vented roof panel.

In another exemplary embodiment, the vented roof panel further comprises a side lip that extends along each of a driver side and a passenger side of the overhead portion. In another exemplary embodiment, each side lip includes an angled portion that overhangs one or more tubular frame members comprising the roll-over protection system. In another exemplary embodiment, each side lip is disposed at or near a substantially 90-degree angle with respect to a top portion of the vented roof panel. In another exemplary embodiment, each of the side lips is configured to hide one or more tubular frame members comprising the roll-over protection system from direct view. In another exemplary embodiment, each of the side lips is configured to provide a drip line for water runoff from the top portion of the vented roof panel.

BRIEF DESCRIPTION OF THE DRAWINGS

The drawings refer to embodiments of the present disclosure in which.

Figure 1:
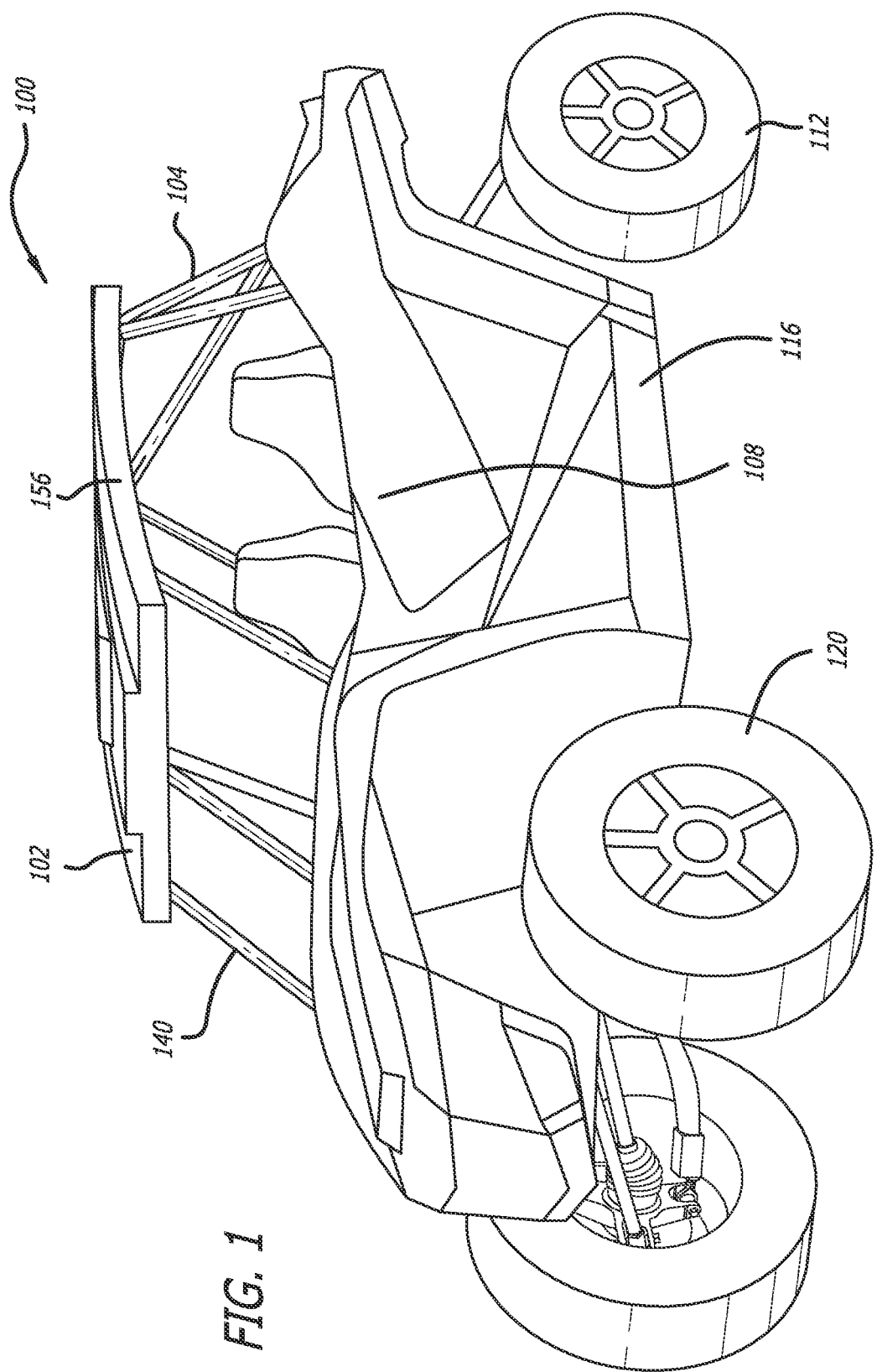
FIG. 1 illustrates an off-road vehicle that includes an exemplary embodiment of a vented roof panel in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first panel," may be made. However, the specific numeric reference should not be interpreted as a literal sequential order but rather interpreted that the "first panel" is different than a "second panel." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a vented roof panel for an overhead portion of a roll-over protection system of an off-road vehicle. The vented roof panel comprises a planar member that includes a shape and a curvature that match the overhead portion to enable closely attaching the vented roof panel to the roll-over protection system. The planar member is formed of any of various plastics, such as injection molded plastic, or other similar materials. An air scoop including an air inlet port is centrally disposed in the planar member. The air inlet port is disposed in a forward-facing portion of the air scoop and configured to direct an airstream from outside to inside the vehicle. The vented roof panel may be attached to tubular frame members comprising the roll-over protection system by way of one or more suitable fasteners. A front lip extends along the width of the vented roof panel from a driver side to a passenger side of the vehicle. The front lip is swept at a similar oblique angle as a windshield portion of the roll-over protection system and is configured to protect occupants from rocks and other debris.

FIG. 1 shows an off-road vehicle 100 that includes an exemplary embodiment of a vented roof panel 102 in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. The roll-over protection system 104 may be a portion of a tube-frame structure that is configured to support various components of the off-road vehicle. Rear wheels 112 of the off-road vehicle 100 may be operably coupled with a chassis 116 by way of a trailing arm suspension system. Front wheels 120 may be operably coupled with the chassis 116 by way of a front suspension system.

Figure 2:
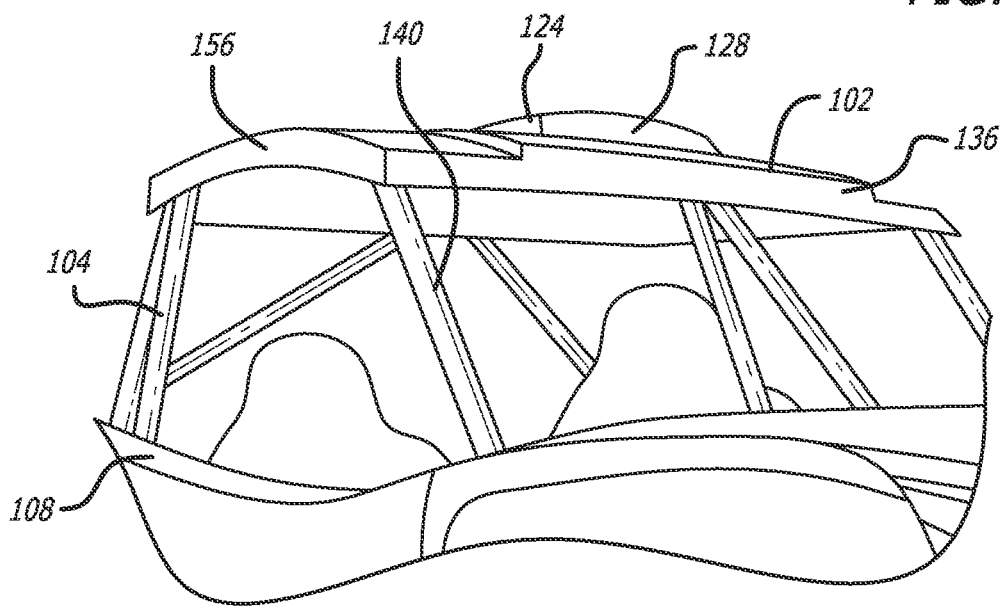
FIG. 2 illustrates a front perspective view of the vented roof panel of FIG. 1, according to the present disclosure.
Figure 3:
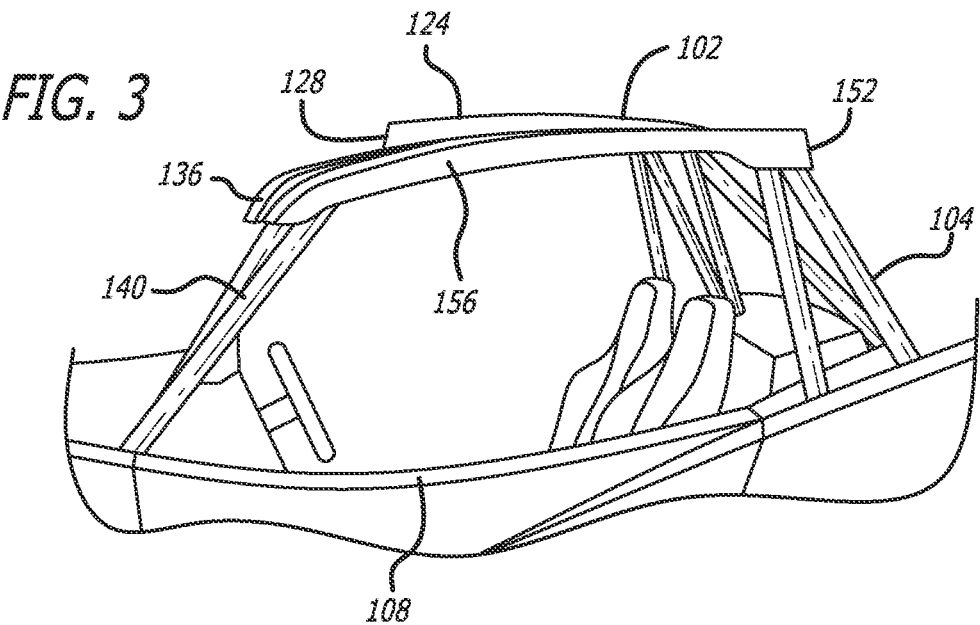
FIG. 3 illustrates a side view of the vented roof panel of FIG. 2 in accordance with the present disclosure.

As shown in FIGS. 2-3, the vented roof panel 102 may be attached to an overhead portion of the roll-over protection system 104. The vented roof panel 102 generally is planar member that may be formed of any of various plastics, such as injection molded plastic, or other similar materials. As best shown in FIG. 3, the vented roof panel 102 may include a shape and a curvature that match the shape and curvature of an overhead portion of the roll-over protection system 104, such that the vented roof panel 102 may be closely coupled to, and supported by, the overhead portion of the roll-over protection system 104. It is contemplated that the vented roof panel 102 may provide additional head protection to occupants, thereby protecting the occupants from potentially serious injuries arising due to, for example, falling rocks that have been kicked up by other vehicles operating ahead of the vehicle 100.

In the embodiment illustrated in FIGS. 2-3, the vented roof panel 102 includes an air scoop 124 that is centrally disposed between a driver side and a passenger side of the vehicle 100. An air inlet port 128 may be disposed in a forward-facing portion of the air scoop 124. As will be appreciated, the air inlet port 128 may be configured to direct an airstream from outside to inside the vehicle 100. It is contemplated that the airstream advantageously reduces instances of heated air being trapped under to the roof panel 102 above the heads of occupants. It is further contemplated that when the vehicle 100 is stationary, the air inlet port 128 allows heated air to escape from underneath the vented roof panel 102, thereby maintaining a relatively cooler environment within the cab enclosure 108.

FIGS. 4-7 illustrate an exemplary embodiment of the vented roof panel 102 coupled with the roll-over protection system 104 in absence of the off-road vehicle 100. In the embodiment illustrated in FIG. 4, the vented roof panel 102 includes the air scoop 124 and the air inlet port 128, as discussed hereinabove. In some embodiments, however, the air scoop 124 may be implemented with a forward-facing panel, in lieu of the air inlet port 128. It is contemplated that the forward-facing panel may enable practitioners of the vented roof panel 102 to create custom air inlet ports, as desired. In some instances, however, the practitioners may opt to omit creating the air inlet ports, and thus the forward-facing panel 132 may be left intact.

Figure 4:
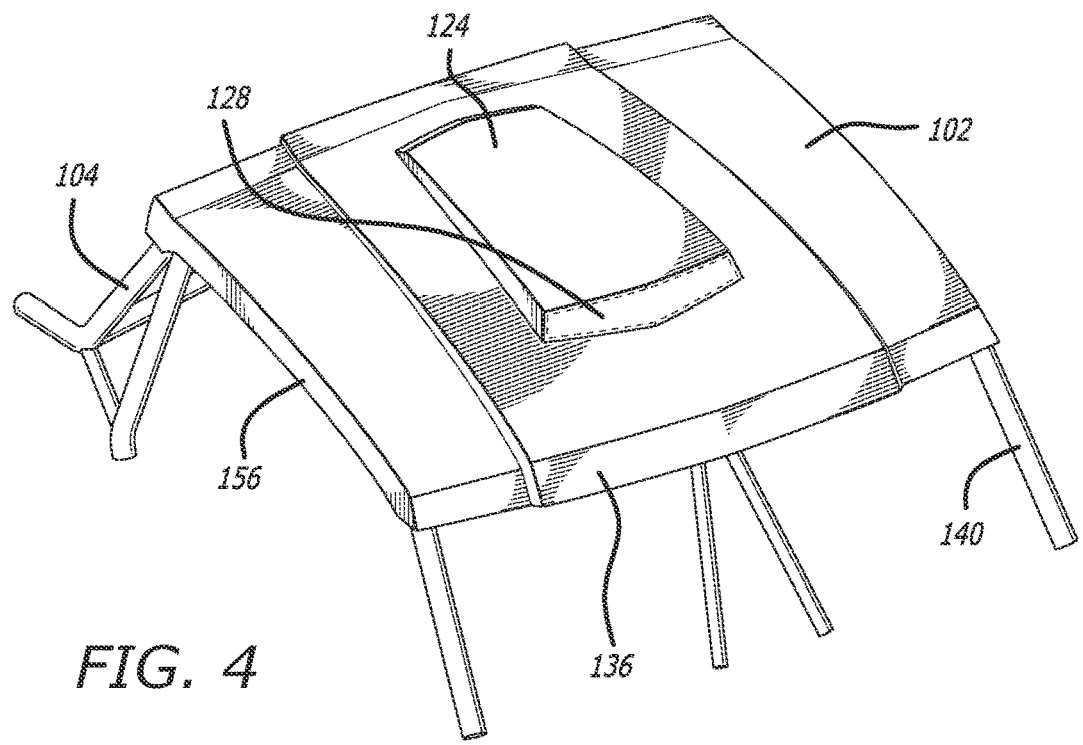
FIG. 4 illustrates a front isometric view of an exemplary embodiment of a vented roof panel coupled with an overhead portion of a roll-over protection system in accordance with the present disclosure.

As further shown in FIG. 4, the roll-over protection system 104 includes a front lip 136 extending from the driver side to the passenger side, along the width of the vented roof panel 102. The front lip 136 generally is a swept strip of the vented roof panel 102 that is oriented at a substantially similar oblique angle as a windshield portion 140 of the roll-over protection system 104. In some embodiments, the front lip 136 may contribute to protecting occupants in the cab enclosure 108 from falling rocks and other debris that may be encountered during traveling over rough terrain. Further, the front lip 136 may operate similarly to a visor that blocks at least a portion of the sun's rays from hindering a driver's vision.

Figure 5:
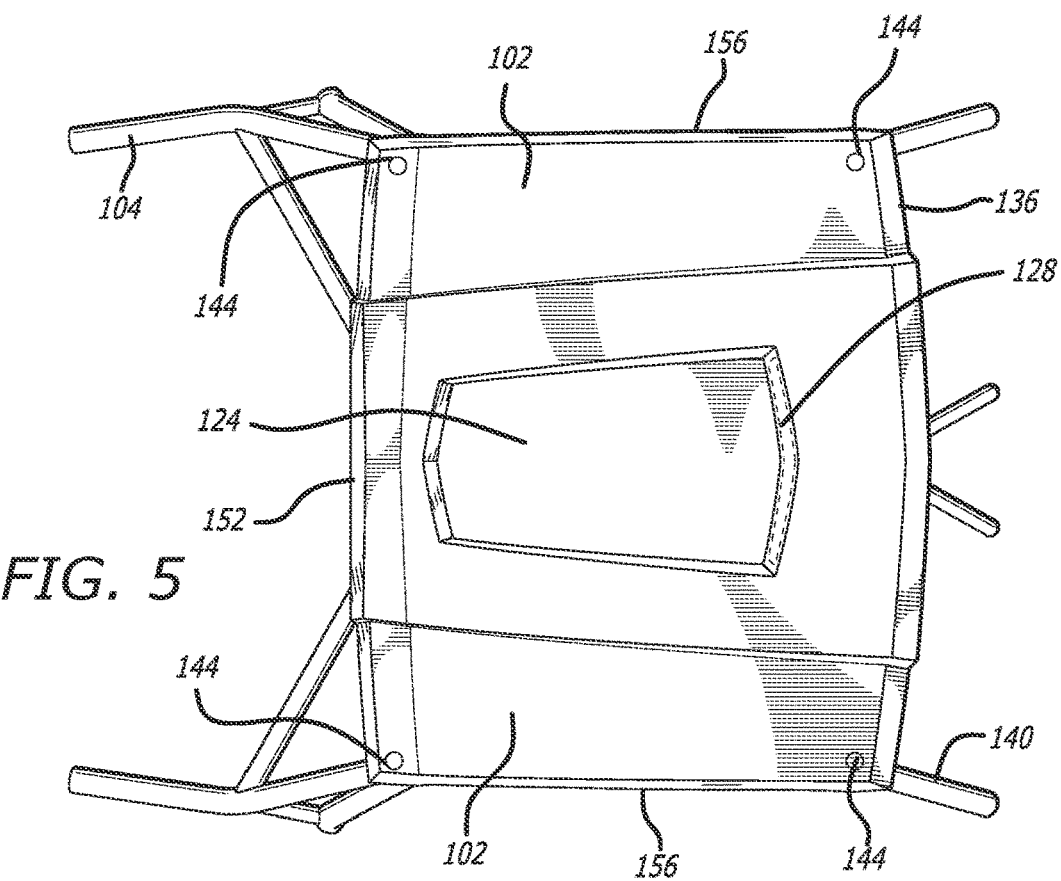
FIG. 5 illustrates a top view of an exemplary embodiment of a vented roof panel, according to the present disclosure.

FIG. 5 illustrates a top view of the exemplary embodiment of the vented roof panel 102 shown in FIG. 4. As discussed hereinabove, the illustrated embodiments of the vented roof panel 102 are shown coupled with the roll-over protection system 104, in absence of the off-road vehicle 100. As best shown in FIG. 5, multiple fasteners 144 may be implemented to attach the vented roof panel 102 to the roll-over protection system 104. As will be appreciated, the fasteners 144 preferably are disposed near the corner portions of the vented roof panel 102. It is contemplated that the fasteners 144 may include one or more of any of various hardware fasteners suitable for securely coupling the vented roof panel 102 to the tubular frame members comprising the roll-over protection system 104. As such, the fasteners 144 may comprise any of bolts, nuts, washers, rivets, screws, locking pins, clamps, clasps, clips, retaining rings, and the like, without limitation.

Figure 6:
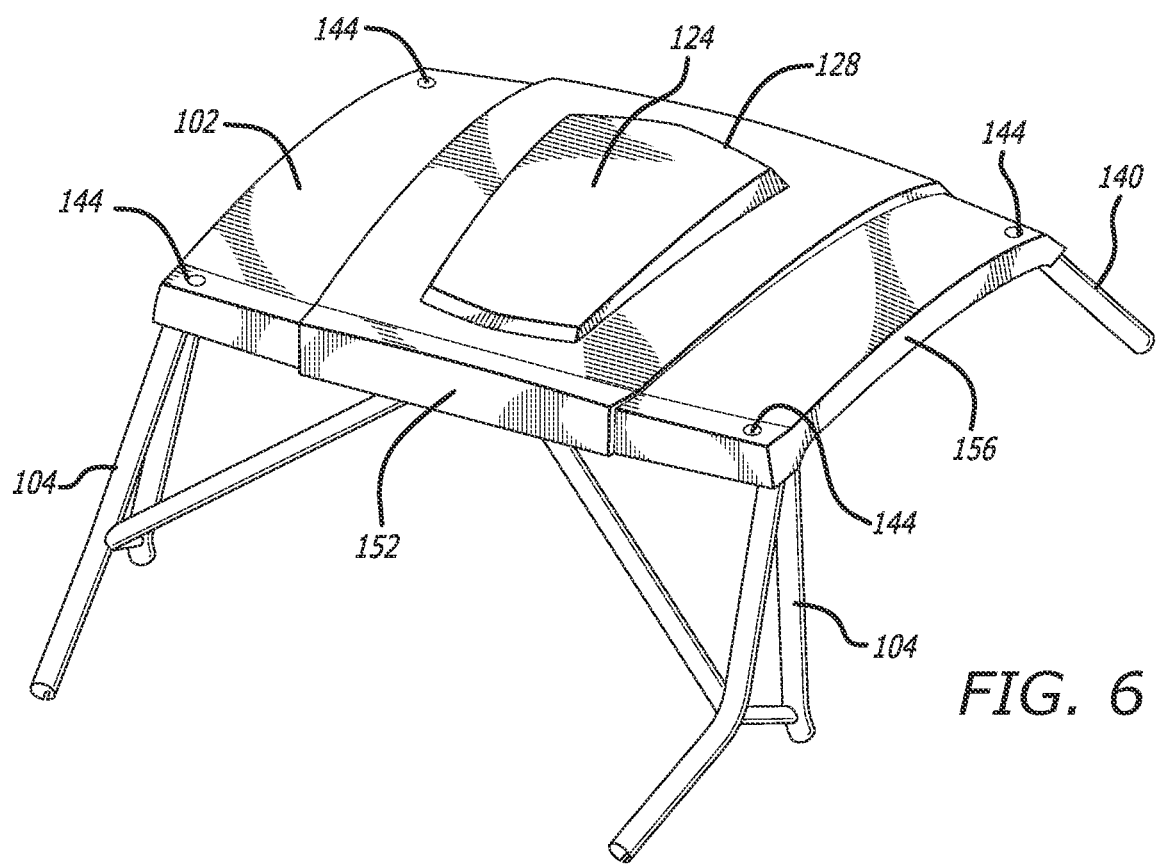
FIG. 6 illustrates a rear isometric view of an exemplary embodiment of a vented roof panel, according to the present disclosure.

FIG. 6 illustrates a rear isometric view of the exemplary embodiment of the vented roof panel 102 shown in FIGS. 4 and 5. As best shown in FIG. 6, the vented roof panel 102 comprises a rear lip 152 extending along the width of the vented roof panel from the driver side to the passenger side of the vented roof panel 102. In some embodiments, the rear lip 152 may comprise a strip portion of the vented roof panel 102 that is angled at or near a substantially 90-degree angle with respect to a top portion of the roof. In some embodiments, the rear lip 152 overhangs one or more of the tubular frame members comprising a rear portion of the roll-over protection system 104. In some embodiments, the rear lip 152 may serve an aesthetic purpose of hiding the tubular frame members from direct view. In some embodiments, however, the rear lip 152 may provide a drip line for water runoff from the top portion of the roof. As such, the rear lip 152 may advantageously direct water runoff away from the tubular frame members comprising the roll-over protection system 104, thereby inhibiting corrosion of the tubular frame members that might otherwise occur due to continual contact with water, dirt, and/or other contaminants.

Figure 7:
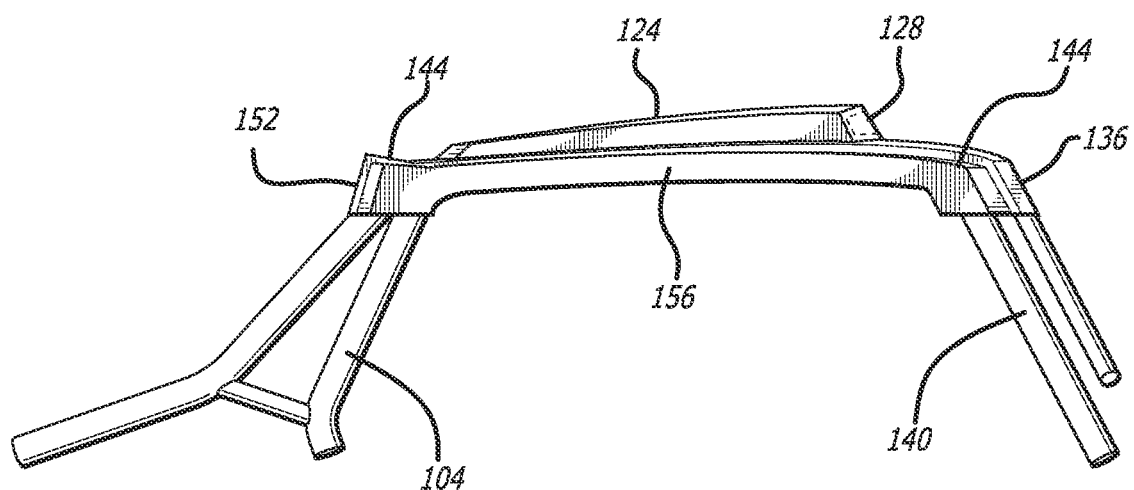
FIG. 7 illustrates a side plan view of an exemplary embodiment of a vented roof panel, according to the present disclosure.

FIG. 7 illustrates a side plan view of the exemplary embodiment of the vented roof panel 102 shown in FIG. 6. As shown in FIG. 7, a side lip 156 extends along the driver side and passenger side of the vented roof panel 102. The side lips 156 operate similarly to the rear lip 152, described above. Accordingly, the side lips 156 include angled portions that overhang portions of the tubular frame members comprising the top portion of the roll-over protection system 104. In some embodiments, the side lips 156 may be disposed at or near substantially 90-degree angles with respect to the top portion of the vented roof panel 102. Similar to the rear lip 152, the side lips 156 may serve an aesthetic purpose of hiding the tubular frame members of the roll-over protection system 104 from direct view. Further, the side lips 156 may provide drip lines for water runoff from the top portion of the vented roof panel 102 so as to inhibit corrosion of the tubular frame members that might otherwise occur due to continual contact with water, dirt, and/or other contaminants.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A vented roof panel for an overhead portion of a roll-over protection system of a vehicle, the vented roof panel comprising:
    a planar member configured to cover an open top of the vehicle, the planar member configured to be mounted over a top of the roll-over protection system,
    a front lip, a rear lip, and side lips extend from the planar member, wherein the front lip, the rear lip, and the side lips are continuous, the rear lip and the side lips are perpendicular to the planar portion, and the front lip is inclined downwards at an angle that corresponds to an angle of a windshield of the vehicle such that to overlap an upper portion of the windshield;
    an air scoop that is centrally disposed in the planar member; and
    an air inlet port disposed in a forward-facing portion of the air scoop,
    wherein the rear lip overhangs a rear tubular frame member of the roll-over protection system hiding the rear tubular frame member.

2. The vented roof panel of claim 1, wherein the vented roof panel is closely mounted over the top of the roll-over protection system.

3. The vented roof panel of claim 1, wherein the planar member is configured to provide head protection to occupants of the vehicle.

4. The vented roof panel of claim 1, wherein the air inlet port is configured to direct an airstream from outside to inside the vehicle.

5. The vented roof panel of claim 1, wherein the air scoop is implemented with a forward-facing panel.

6. The vented roof panel of claim 5, wherein the air inlet port is disposed in the forward-facing panel.

7. The vented roof panel of claim 1, wherein the front lip extends along a width of the vented roof panel.

8. The vented roof panel of claim 7, wherein the angle of the front lip is an oblique angle.

9. The vented roof panel of claim 3, wherein the front lip is configured to protect the occupants from falling rocks and other debris.

10. The vented roof panel of claim 9, wherein the front lip acts as a visor that blocks at least a portion of the sun's rays from hindering a driver's vision.

11. The vented roof panel of claim 1, wherein the rear lip extends along a width of the vented roof panel.

12. The vented roof panel of claim 1, wherein the rear lip is configured to hide the rear tubular frame member.

13. The vented roof panel of claim 1, wherein the rear lip is configured to provide a drip line for water runoff from the vented roof panel.

14. A vented roof panel for an overhead portion of a roll-over protection system of a vehicle, the vented roof panel comprising:
a planar member configured to cover an open top of the vehicle, the planar member configured to be mounted over a top of the roll-over protection system,
a front lip, a rear lip, and side lips extend from the planar member, wherein the front lip, the rear lip, and the side lips are continuous, the rear lip and the side lips are perpendicular to the planar portion, and the front lip is inclined downwards at an angle that corresponds to an angle of a windshield of the vehicle such that to overlap an upper portion of the windshield;
an air scoop that is centrally disposed in the planar member; and
an air inlet port disposed in a forward-facing portion of the air scoop, wherein the side lips extend along a length of the top of the roll-over protection system,
wherein the side lips overhang side tubular frame members of the roll-over protection system.

15. The vented roof panel of claim 14, wherein the side lips are configured to hide side tubular frame members.

16. The vented roof panel of claim 15, wherein each of the side lips is configured to provide a drip line for water runoff from the vented roof panel.

17. A vented roof panel for an overhead portion of a roll-over protection system of a vehicle, the vented roof panel comprising:
a planar member configured to cover an open top of the vehicle, the planar member configured to be mounted over a top of the roll-over protection system,
a front lip, a rear lip, and side lips extend from the planar member, wherein the front lip, the rear lip, and the side lips are continuous, the rear lip and the side lips are perpendicular to the planar portion, and the front lip is inclined downwards at an angle that corresponds to an angle of a windshield of the vehicle such that to overlap an upper portion of the windshield;
an air scoop that is centrally disposed in the planar member; and
a panel disposed in a forward-facing portion of the air scoop, wherein the panel is configured to have an air inlet port, wherein the air inlet port is configured to direct an airstream from outside to inside the vehicle.

* * * * *